United States Patent
Bakin et al.

(10) Patent No.: US 6,763,439 B1
(45) Date of Patent: Jul. 13, 2004

(54) DISK THROTTLING AND PRIORITY QUEUING FOR STREAMING I/O

(75) Inventors: David S. Bakin, Seattle, WA (US); William G. Parry, Bellevue, WA (US); Mark H. Lucovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,687

(22) Filed: May 1, 2000

(51) Int. Cl.[7] .......................... G06F 13/18; G06F 13/20
(52) U.S. Cl. .......................... 711/158; 711/4; 711/112; 711/151; 711/154; 711/158; 711/163; 711/167; 709/231; 710/25; 710/44; 710/45; 710/58; 710/117; 710/124
(58) Field of Search .......................... 711/4, 112, 151, 711/153, 154, 158, 163, 167, 173, 221; 710/44, 117, 124, 58, 112, 25; 709/231

(56) References Cited

U.S. PATENT DOCUMENTS

| | | | | |
|---|---|---|---|---|
| 5,754,882 A | * | 5/1998 | Tobagi et al. ................. | 710/21 |
| 5,761,417 A | * | 6/1998 | Henley et al. ............... | 709/231 |
| 5,829,046 A | * | 10/1998 | Tzelnic et al. ............... | 711/100 |
| 5,832,309 A | * | 11/1998 | Noe et al. ...................... | 710/61 |
| 5,852,705 A | * | 12/1998 | Hanko et al. .................. | 386/92 |
| 5,974,503 A | * | 10/1999 | Venkatesh et al. .......... | 711/114 |
| 5,987,479 A | * | 11/1999 | Oliver .......................... | 707/205 |
| 6,212,657 B1 | * | 4/2001 | Wang et al. .................... | 714/6 |
| 6,378,035 B1 | * | 4/2002 | Parry et al. ................. | 711/110 |
| 6,385,673 B1 | * | 5/2002 | DeMoney .................... | 709/225 |
| 6,438,630 B1 | * | 8/2002 | DeMoney .................... | 709/103 |

* cited by examiner

Primary Examiner—Mano Padmanabhan
Assistant Examiner—Jasmine Song
(74) Attorney, Agent, or Firm—Lee & Hayes, PLLC

(57) ABSTRACT

A system is configured to prioritize streaming disk I/O over non-streaming disk I/O by providing high priority queuing to streaming disk I/O and/or to throttle non-streaming disk I/O when the total disk I/O (streaming+non-streaming) exceeds a threshold amount for a given time quantum. When disk throttling is utilized, streaming disk I/O is processed in a first time quantum. Non-streaming disk I/O is processed, as much as possible, in the remainder of the first time quantum. Other non-streaming disk I/O remaining to be processed is deferred to a subsequent time quantum.

36 Claims, 4 Drawing Sheets

DISK THROTTLING

STREAMING DISK I/O SYSTEM
("TIMESHIFTING")

DISK THROTTLING

PRIORITY QUEUING OF
STREAMING DISK I/O

DISK THROTTLING AND PRIORITY QUEUING FOR STREAMING I/O

TECHNICAL FIELD

This invention relates to systems that process streaming disk I/O and non-streaming disk I/O and, in particular, to a system in which processing of streaming disk I/O is prioritized over processing of non-streaming disk I/O.

BACKGROUND

The advent of streaming input/output (I/O) technology has proven to be a major advancement in the development of computer technology for entertainment and multimedia products and services. Streaming technology is used, for instance, to provide full-motion video over the Internet or from another source. As the name indicates, streaming technology provides a stream of data from an input source such as a disk, video camera, computer file, etc., and renders that data to an output device, typically a video monitor. In most implementations, the input of the data stream is closely synchronized with the output of the data stream so that when a portion of the data stream is being input, another portion of the data stream is being output.

A concept related to streaming is "timeshifting." Timeshifting involves reading and writing audiovisual data to and from a data source in close to real time. A significant difference in timeshifting and simple streaming is that a portion of a data stream may be input even if another portion of the same data stream is not being output. For instance, a live broadcast may be input in an audiovisual data stream onto a hard disk drive. A viewer of the broadcast may receive audiovisual data output almost immediately after the audiovisual data is written to the disk. However, the viewer may choose to "pause" the live broadcast. In this case, the audiovisual data continues to be input onto the disk, but the output stream is momentarily interrupted. The amount of audiovisual data on the disk increases as the input continues while the output is paused. The viewer may then resume output of the audiovisual data stream to continue to view the "live" broadcast from the point where it was interrupted. The amount of data on the disk remains relatively static as long as the input and output occur contemporaneously. When the input stream is halted, the amount of audiovisual data on the disk decreases as the viewer continues to receive the output stream until the stream is terminated.

This technology is limited by the bandwidth of the disk to which the data is written and from which the data is read. As used herein with regard to a disk, the term "bandwidth" refers to the volume of data that can be written to the disk in a given amount of time. For example, a disk may have a bandwidth of 0.5 megabytes per 100 milliseconds. This means that during a 100 millisecond period, the disk can receive or transmit 0.5 megabytes of data.

Streaming of audiovisual data imposes significant bandwidth requirements on a processor and I/O subsystem of a computer system. A single timeshifting application can easily consume most of the capacity of the processor and I/O subsystem on currently available platforms. If the disk bandwidth is exceeded, the user will experience undesirable artifacts such as video frame dropping, audio glitches, etc. It is, therefore, very important to manage disk bandwidth to the greatest extent possible when processing streaming applications.

The disk bandwidth limitation becomes even more important when consideration is given to systems that run both streaming applications and stochastic, or non-streaming applications. A non-streaming application is a typical computer application, such as a word processor, that utilizes processor time, but does not do so in a time-critical manner. While non-streaming applications should be processed in a timely manner for user satisfaction, these types of applications can typically be deferred for a few hundred milliseconds or so without causing a noticeable difference to the viewer. This is not the case with streaming applications, wherein a one hundred millisecond delay can cause a problem that is noticeable by the user.

It is, therefore, desirable to ensure that streaming disk I/O is processed in a timely manner while still allowing for adequate processing of non-streaming disk I/O. This can be done in most instances by prioritizing processing of streaming disk I/O and deferring processing of non-streaming disk I/O. There is a means by which this can be done, theoretically, in present systems. That is to set a "high-priority" bit to allow faster access to the processor. However, many applications already utilize this bit and it has generally become somewhat overused. Therefore, simply setting this bit for streaming disk I/O operations will not provide the desired result.

SUMMARY

Described herein are methods for priority queuing of streaming disk I/O over non-streaming disk I/O and/or disk throttling, and systems and computer programs for implementing the methods. Disk throttling involves dividing disk bandwidth into discrete time quanta. When disk throttling is utilized, streaming disk I/O is processed first in a first time quantum. If there is any bandwidth remaining in the first time quantum, non-streaming disk I/O is processed in that time quantum to the greatest degree possible. Any non-streaming disk I/O that remains to be processed is deferred to a subsequent time quantum.

Priority queuing for streaming disk I/O involves parsing disk I/O to determine if the disk I/O is streaming or non-streaming. If the disk I/O is streaming, it is processed ahead of the non-streaming I/O. There are several ways to determine which disk I/O is streaming and which is non-streaming.

One way to distinguish streaming disk I/O from non-streaming disk I/O is to divide the disk into two partitions. Streaming data—or applications that utilize streaming data—are stored in one partition. Non-streaming data—or applications that utilize non-streaming data—are stored in the other partition. The system can then ascertain which disk I/O is streaming disk 110 simply by determining to which partition the data is being written, or from which partition the data is being read.

Another way in which streaming disk I/O can be identified is to include a streaming flag in an application program interface through which an application communicates with a system. If the application utilizes streaming disk I/O, then the application sets the streaming flag. The system recognizes the streaming flag when it is set and considers all disk I/O received and transmitted to that application as streaming disk I/O. The disk I/O is thus given a higher priority than non-streaming disk I/O. In a related manner, an application can inform a system on which it is to run that it utilizes streaming disk I/O. This can be done without the use of a flag in an application program interface. The system can thereafter treat the disk I/O from this application as streaming and manage it accordingly.

The distinction between streaming disk I/O and non-streaming disk I/O can also be made with the use of an application lookup table. The application lookup table contains names of applications that utilize streaming disk I/O. When the application is started, the system refers to the application lookup table. If the name of the application is found in the application lookup table, the system gives disk I/O from that application higher priority than disk I/O from applications that only utilize non-streaming disk I/O.

The application lookup table can be provided with a system, built as the system executes applications, or both. If the application lookup table is provided with the system, there is no work for the system to do other than to refer to the table. The problem with this way of providing the application lookup table is, however, that new applications cannot be added to the application lookup table as the system ages.

If the application lookup table is constructed by the system, the system will initially refer to the application lookup table when starting an application. If the application name is not in the application lookup table, the system proceeds as if the application utilizes only non-streaming disk I/O. If, however, the system finds that the application does, in reality, utilize streaming disk I/O, the system adds the name of the application to the application lookup table. Hence, the next time the application is run, the system will provide its required disk bandwidth at a high priority.

If a combination of these methods is used, an application lookup table is initially provided with the system. If the name of the application is not found in the application lookup table, but the application utilizes streaming disk I/O, the system will add the name of the application to the application lookup table. This initially provides a more complete application lookup table for the system, but it is dynamic and can grow and add applications as the system ages.

A final way discussed herein to distinguish between streaming disk I/O and non-streaming disk I/O is to add a streaming flag to any file that utilizes streaming disk I/O. When the system prepares to process a file, it will provide high priority processing for the disk I/O of that file if the streaming flag is set for that file. This method is more exact than treating the disk I/O of an entire application as streaming if any streaming disk I/O is utilized by that application. However, this requires a deeper change to most systems which may be prohibitive in view of the other methods discussed herein.

These methods and systems implementing these methods are described in more detail below.

DETAILED DESCRIPTION

Figure 1:
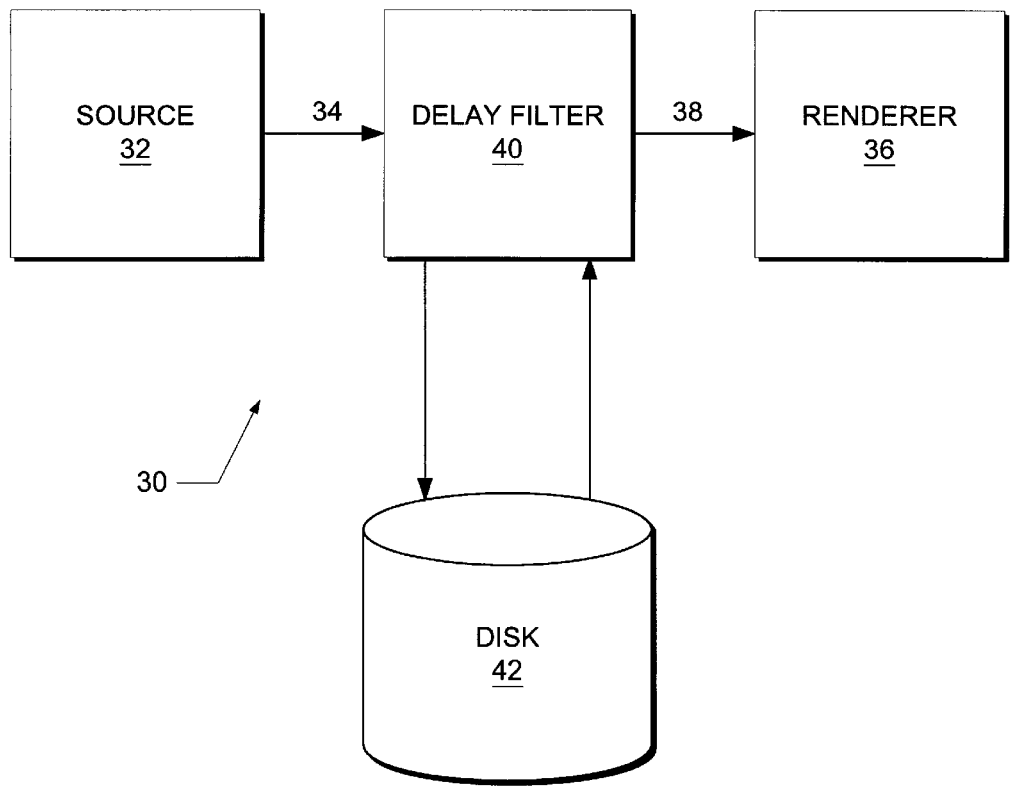
FIG. 1 is a block diagram of a prior art streaming I/O system.

FIG. 1 shows a prior art streaming disk I/O—or, more specifically, a "timeshifting"—system 30. The streaming disk I/O system 30 includes a source 32 from which an input data stream 34 is provided. This source can be a file stored locally, a file stored at a remote location and accessed over a network such as the Internet, a digital camera, DVD, etc.

The streaming disk I/O system 30 also includes a renderer 36 which renders an output data stream 38 on an output device (not shown) to produce a streaming output in a form recognizable by a viewer. Typically, such an output device is a video monitor (not shown). In such a case, the renderer 36 comprises a video graphics card.

The streaming disk I/O system 30 also has a delay filter 40 which stands as an intermediary between the input data stream 34 and the output data stream 38. The input data stream 34 is fed into the delay filter before being written onto a disk 42 of the system 30. The data that is written onto the disk 42 is read into the delay filter 40 from the disk 42 before the data is sent to the renderer 36 as the output data stream 38.

The delay filter 40 allows the viewer to control the rate at which the output data stream 38 follows the input data stream 34. If the viewer is viewing a full motion video, the viewer can pause what she is watching without affecting the rate at which the input data stream 34 is written to the disk 42. When the viewer resumes viewing the video, the output data stream 38 resumes to output the data that is written to the disk 42 through the input data stream 34.

As explained previously, disk throttling is a concept wherein bandwidth of a system disk is divided into discrete time quanta. A time quantum is a period of time during which a certain amount of data can be written to the system disk or read from the system disk before interfering with streaming disk I/O.

For example, suppose a system disk has a bandwidth of 0.5 megabytes per 100 millisecond time quantum. If a streaming disk I/O process is running which requires 0.3 megabytes during this time quantum, then up to 0.2 megabytes of non-streaming disk I/O can be processed without interfering with the processing of the streaming disk I/O. If non-streaming disk I/O requires more than 0.2 megabytes, then the amount of non-streaming disk I/O in excess of 0.2 megabytes is deferred and resubmitted for processing during a subsequent time quantum.

Instead of utilizing an amount of data per time quantum, the method may use another parameter to limit during a time quantum, such as a number of disk seeks that may occur in a time quantum. Utilizing disk seeks to throttle disk I/O will be discussed in greater detail as the discussion progresses.

Streaming disk I/O is given a high priority in this method. Any streaming disk I/O that is to be processed is processed in a first time quantum before any non-streaming disk I/O that is to be processed. If there is any time left in the first time quantum, it is used to process at least a portion of the non-streaming disk I/O. If the time quantum expires without completing processing of the non-streaming disk I/O, the remainder of the non-streaming disk I/O is resubmitted for processing in a subsequent time quantum.

Figure 2:
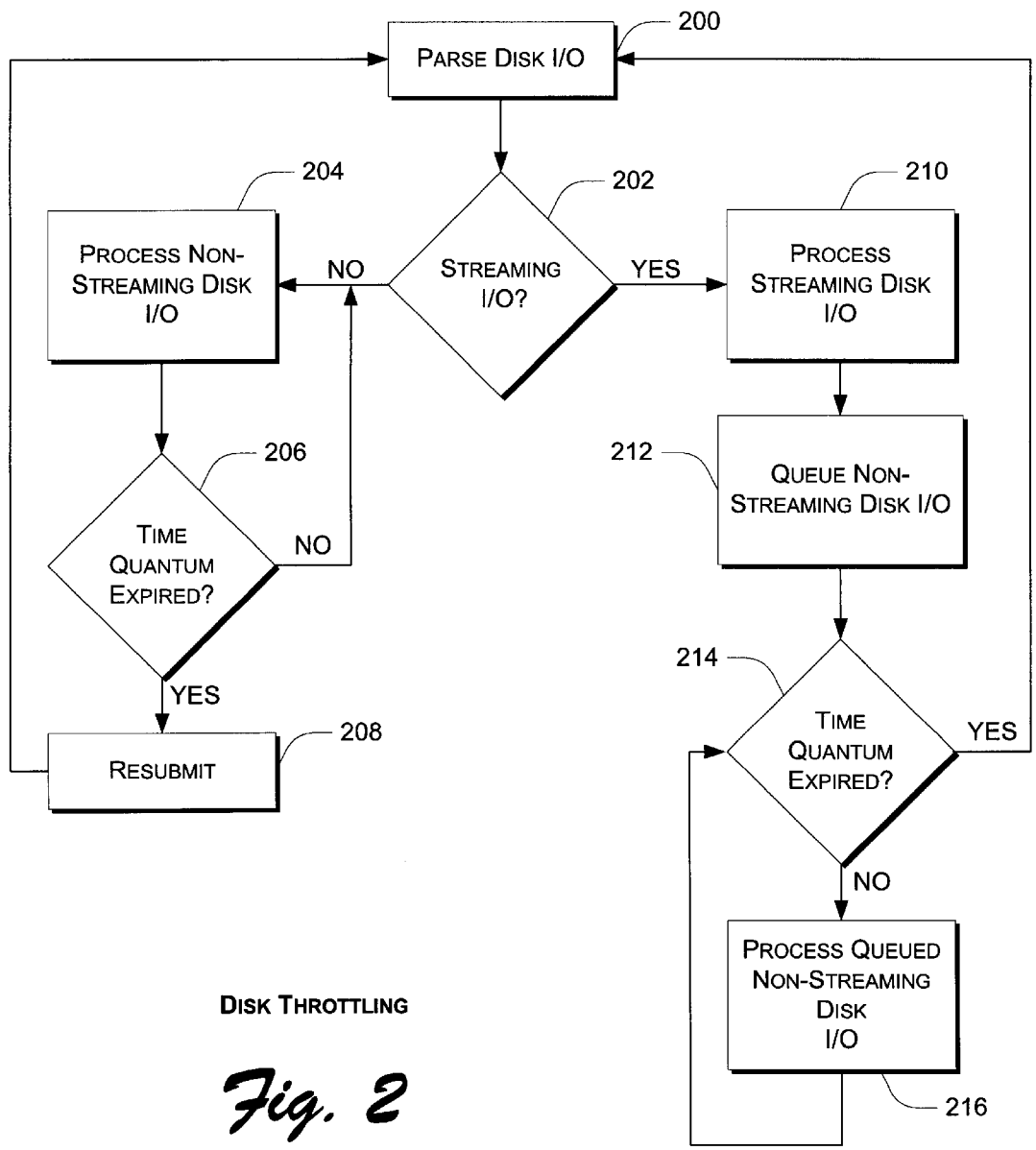
FIG. 2 is a flow diagram of a method for utilizing disk bandwidth time quanta to prioritize processing of streaming I/O over non-streaming I/O.

FIG. 2 depicts a flowchart that details a method for disk throttling, wherein disk bandwidth is divided into discrete time quanta. At step 200, disk I/O is received for processing and parsed to determine whether it is streaming disk I/O or non-streaming disk I/O. If there is only non-streaming disk I/O in the disk I/O ("NO" branch, step 202), the non-streaming disk I/O is processed at step 204. The processing of the non-streaming disk I/O continues as long as the time quantum has not expired ("NO" branch, step 206). When the time quantum has expired ("YES" branch, step 206), the non-streaming disk I/O is resubmitted for processing at step 208.

If the disk I/O is for streaming disk I/O or a combination of streaming and non-streaming disk I/O, ("YES" branch, step 202), the streaming disk I/O is processed at step 210. The non-streaming disk I/O is queued for processing after the processing of the streaming disk I/O is completed (step 212). When the streaming disk I/O has been processed, the system determines if the current time quantum has expired at step 214. If the time quantum has expired ("YES" branch, step 214), then the process returns to parsing disk I/O at step 200. If the time quantum has not expired ("NO" branch, step 214), then the queued non-streaming disk I/O is processed at step 216 until the time quantum expires.

Figure 3:
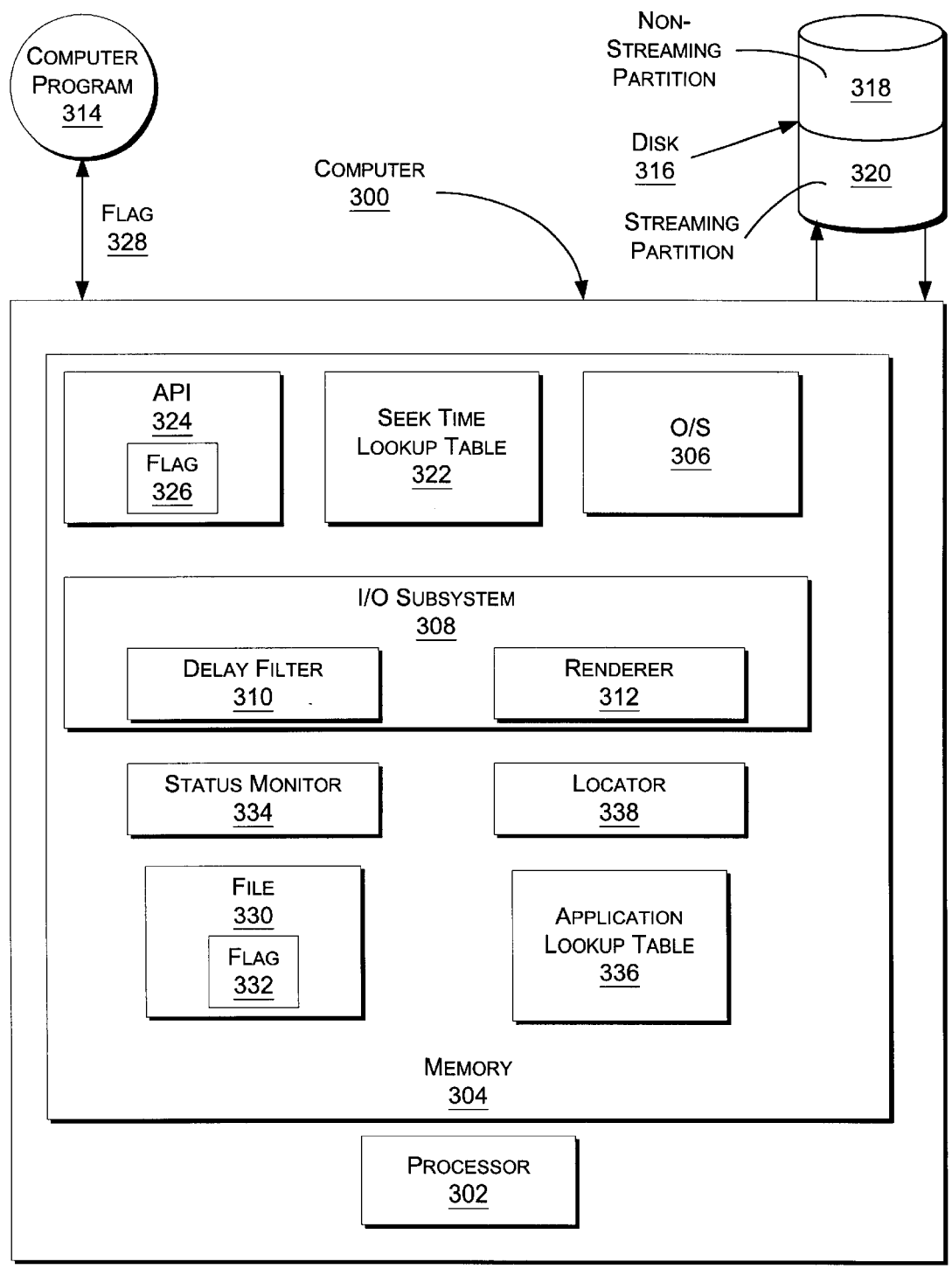
FIG. 3 is a block diagram of a computer system configured to prioritize processing of streaming disk I/O over non-streaming disk I/O.

FIG. 3 depicts a computer 300 in which the methods described herein may be implemented. The computer 300 includes a processor 302, memory 304, and an operating system 306 resident in the memory 304. The computer 300 also has an I/O subsystem 308 that includes a delay filter 310 and renderer 312 similar to those described with respect to FIG. 1. Other aspects of the computer 300 will be described as the discussion progresses.

A computer program 314 is configured to execute on the processor 302 of the computer 300. In addition, a disk 316 communicates with the computer 300. This disk 316 has a non-streaming partition 318 that contains non-streaming disk I/O and a streaming partition 320 that contains only streaming disk I/O. The significance of these partitions will become clear in further discussion of the invention.

As referred to previously, the parameter measured against a time quantum may not necessarily be the amount of data transferred to/from the disk 316. The parameter may be a specific number of disk seeks. Since a disk seek is a function for which an average time may be determined, it may be desirable to allow a maximum number of disk seeks to occur during a given time quantum before deferring non-streaming disk I/O to a subsequent time quantum. To do this, the system must be aware of the average seek time of the disk 316 with which it is working.

This may be done by the computer 300 performing empirical tests at initialization to determine the average seek time of the disk 316. Alternatively—and as shown in FIG. 3—the memory 304 of the computer 300 may contain a seek time lookup table 322 in which average seek times of a number of disks are stored. At initialization, the computer 300 determines the type of disk 316 and looks for this type in the seek time lookup table 322. If the disk 316 is located in the seek time lookup table 322, then the computer 300 can simply read the average seek time for the disk 316 from the seek time lookup table 322. If, however, the disk 316 type is not located in the seek time lookup table 322, the computer 300 may then perform empirical tests to determine the average seek time for the disk 316.

As previously mentioned, disk throttling—wherein the disk bandwidth is divided into discrete time quanta—is not necessarily required to optimize performance of a system that processes both streaming disk I/O and non-streaming disk I/O. Priority queuing of streaming data, as outlined in FIG. 4, optimizes performance of a system that processes both streaming and non-streaming disk I/O.

Figure 4:
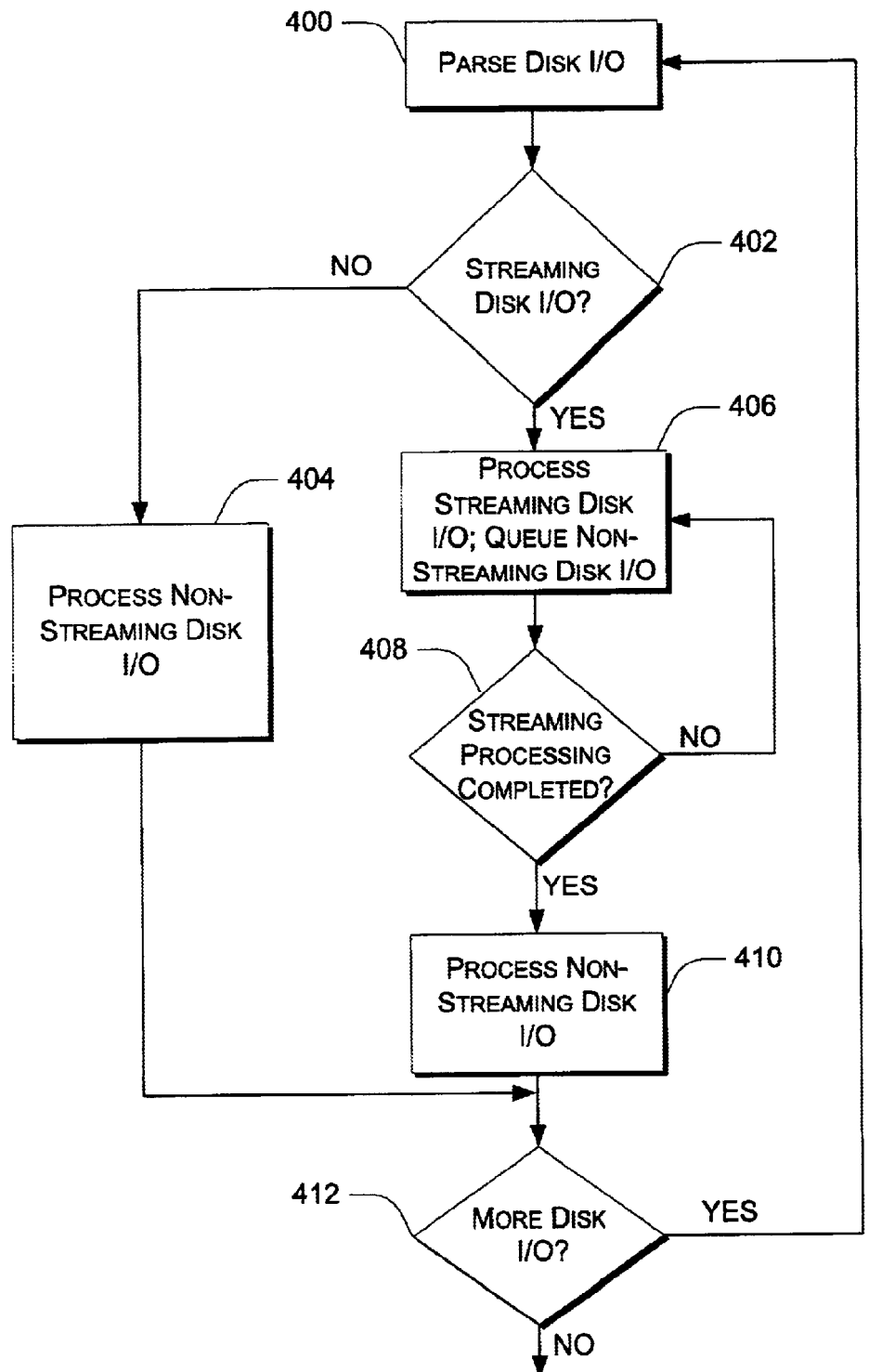
FIG. 4 is a flow diagram of a method for priority queuing of streaming disk I/O over non-streaming disk I/O.

Referring now to FIG. 4—priority queuing of streaming disk I/O—disk I/O is parsed at step 400. At step 402, the system determines whether the disk I/O contains streaming disk I/O. If not ("NO" branch, step 402), then the disk I/O only contains non-streaming disk I/O and the non-streaming disk I/O is processed at step 404.

If the disk I/O contains streaming disk I/O ("YES" branch, step 402), then the streaming disk I/O is processed and the non-streaming disk I/O, if any, is queued (step 406). At step 408, if the processing of the streaming disk I/O has not been completed, the processing of the streaming disk I/O continues ("NO" branch, step 408). If the processing of the streaming disk I/O has been completed ("YES" branch, step 408), then the non-streaming disk I/O is processed at step 410. If more disk I/O is received at step 412, then the process is repeated and streaming disk I/O is processed before further non-streaming disk I/O ("YES" branch, step 412).

Whether disk throttling is utilized or if only priority queuing of streaming disk I/O is implemented, it is essential that the system have the ability to distinguish streaming disk I/O from non-streaming disk I/O.

Referring back to FIG. 3, several features are shown which enable the computer 300 to make such a distinction. One way in which this may be done is to partition the disk 316 as shown, with non-streaming disk I/O contained in the non-streaming partition 318, and streaming disk I/O contained in the streaming partition 320. If the I/O subsystem 308 determines that data is coming from or being written to a disk sector located in the streaming partition 320 of the disk 316, then the disk I/O is considered to be streaming I/O and is recognized as such at step 202 of FIG. 2 and at step 402 of FIG. 4.

Another way in which the distinction between streaming disk I/O and non-streaming disk I/O can be made is through the use of a streaming flag in an application program interface. The computer 300 includes an application program interface (API) 324 in the memory 302. The API is an interface between the computer 300 and the computer program 314. The API contains a streaming flag 326. If the computer program 314 utilizes streaming disk I/O, then the computer program 314 sets the streaming flag 326. The computer 300 recognizes the streaming flag 326 when it is set and treats all disk I/O associated with the computer program 314 as streaming disk I/O. Therefore, when the appropriate time comes to make the distinction between streaming disk I/O and non-streaming disk I/O, the computer 300 can recognize the computer program 314 as utilizes streaming disk a/o.

In a related manner, the computer program may simply provide a streaming flag 328 to the computer as part of its I/O processing with the computer 300. Even though this is not done utilizing an API, the computer 300 is nonetheless notified that the computer program 314 uses streaming disk I/O and the computer 300 can make the appropriate decisions at step 202 of FIG. 2 and at step 402 of FIG. 4.

The computer 300 also includes a file 330, a streaming flag 332 and a status monitor 334. The file 330 is an executable file that is processed by the processor 302. Computers similar to the computer 300 shown in FIG. 3 typically have several, possibly hundreds, of such files. For convenience, such files are represented in the computer 300 by the file 330.

The file 330 has a streaming flag 332 that functions similarly to streaming flag 326 and streaming flag 328. As the file 330 is processed, the status monitor 334 checks the file 330 to determine if the streaming flag 328 is set. If the streaming flag 328 is set, then the file 330 utilizes streaming disk I/O and the computer 300 can make allowances therefor.

This method of flagging individual files is a very efficient way in which to limit disk I/O treated as streaming disk I/O to disk I/O which is actually streaming disk I/O, since a smaller amount of non-streaming disk I/O will be treated as streaming I/O simply because the file contains some streaming I/O. However, it is noted that this method requires changes to kernel mode levels of a file system of a computer and may not be the most feasible to implement.

A simpler implementation is to provide an application lookup table 336 and a locator 338 as shown included in the memory 304 of the computer 300. The application lookup table contains names of applications that utilize streaming disk I/O. Prior to launching an application, the locator 338 scans the application lookup table for the name of the application being launched. If the name of the application is present in the application lookup table 336, then the disk I/O from that application is treated as streaming I/O for purposes of the methods described in FIGS. 2 and 4.

If the name of the application is not located in the application lookup table 336 but when running the application, the computer 300 finds that the application requires processing of streaming disk I/O, the name of the application is added to the application lookup table 336 for future reference.

Conclusion

The system and methods described herein greatly improve processing of streaming disk I/O in systems that also process non-streaming disk I/O by making efficient use of disk bandwidth and by ensuring priority queuing of streaming disk I/O.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. In a system that processes streaming disk input/output (I/O) and non-streaming disk I/O, a method of prioritizing the disk I/O, comprising:
   dividing disk bandwidth of a disk utilized in the system into discrete time quanta;
   receiving disk I/O;
   determining whether the disk I/O is streaming disk I/O or non-streaming disk I/O;
   processing streaming disk I/O in a first time quantum;
   processing non-streaming disk I/O in any unused portion of the first time quantum;
   deferring processing of any remaining non-streaming disk I/O that could not be processed in the first time quantum to a subsequent time quantum; and
   wherein the time quanta are measured by a maximum number of disk seek operations that can be processed in each time quantum.

2. The method as recited in claim 1, wherein the determining whether the disk I/O is streaming disk I/O or non-streaming disk I/O further comprises utilizing a sector number from which the I/O is received to determine whether the disk I/O is streaming disk I/O or non-streaming disk I/O.

3. The method as recited in claim 1, further comprising:
   dividing a disk into first and second partitions, the first partition containing streaming disk I/O data and the second partition containing non-streaming disk I/O data; and
   wherein the determining further comprises identifying one of the first or second partitions.

4. The method as recited in claim 2, wherein the maximum amount of disk I/O that can be processed in each time quantum is, measured as a number of disk seeks.

5. The method as recited in claim 1, wherein the number of disk seek operations is dependent on a seek time for the disk utilized by the system.

6. The method as recited in claim 5, wherein the seek time for the disk utilized by the system is determined by system tests.

7. The method as recited in claim 5, wherein the seek time for the disk utilized by the system is determined from a seek time lookup table that contains seek times for a plurality of disks.

8. The method as recited in claim 7, wherein the seek time for the disk utilized by the system is determined by system tests if the seek time for the disk utilized in the system is not located in the seek time lookup table.

9. One or more computer-readable media containing instructions which, when executed on a computer, perform the method recited in claim 1.

10. The method as recited in claim 1, wherein the determining whether the disk I/O is streaming I/O or non-streaming I/O further comprises polling a streaming I/O flag in an application program interface, the streaming flag being set by an application using the interface if the application utilizes streaming disk I/O.

11. The method as recited in claim 1, wherein the determining further comprising:
   determining that the disk I/O is non-streaming disk I/O if the disk I/O originates with an application that is not contained in an application lookup table; subsequently determining that the disk I/O is streaming disk I/O; and adding the application name to the lookup table.

12. The method as recited in claim 1, wherein the determining further comprises receiving notification from an application that it uses streaming disk I/O.

13. The method as recited in claim 1, wherein the determining further comprises accessing a table that lists applications that use streaming disk I/O and determining that the streaming disk I/O is used by a current application if the current application is listed in the table.

14. The method as recited in claim 1, wherein the determining further comprises checking a file flag associated with a file to be processed, the file flag being set to indicate that the file utilizes streaming disk I/O.

15. A method of prioritizing processing of streaming disk I/O ahead of processing of non-streaming disk I/O, the method comprising:
   determining whether disk I/O is streaming disk I/O or non-streaming disk I/O by referring to a lookup table that contains multiple application names that utilize streaming disk I/O and determining that the disk I/O is streaming disk I/O if the disk I/O originates with an application contained in the lookup table;
   processing the streaming disk I/O immediately; and
   deferring the non-streaming disk I/O for later processing after the streaming disk I/O has been processed.

16. The method as recited in claim 15, further comprising:
   determining that the disk I/O is non-streaming disk I/O if the disk I/O originates with an application that is not contained in the application lookup table;
   subsequently determining that the disk I/O is streaming disk I/O; and
   adding the application name to the lookup table.

17. One or more computer-readable media containing instructions which, when executed on a computer, perform the method recited in claim 15.

18. A system that processes streaming disk I/O and non-streaming disk I/O, the system comprising:

a disk having bandwidth divided into discrete time quanta;

an I/O subsystem configured to process streaming disk I/O in a first time quantum and non-streaming disk I/O in the first time quantum after the streaming disk I/O has been processed, the I/O subsystem deferring further processing of non-streaming disk I/O to a subsequent time quantum after the first time quantum has expired; and wherein a time quantum is defined as a maximum number of system disk seek operations that can be performed during a specified period of time.

19. The system as recited in claim 18, wherein:

the disk includes a first partition that contains streaming disk I/O and a second partition that contains non-streaming disk I/O; and the I/O subsystem being further configured to identify disk I/O as streaming disk I/O or non-streaming disk I/O based on which of the first or second partitions of the disk on which the disk I/O resides.

20. The system as recited in claim 18, further comprising means for distinguishing between streaming disk I/O and non-streaming disk I/O.

21. The system as recited in claim 20, wherein the system further comprises:

a processor to execute computer programs;

an application program interface to interface a computer program to execute on the processor; and wherein the means for distinguishing between streaming disk I/O and non-streaming disk I/O comprises a streaming I/O flag in the application program interface that is set by the computer program if the computer program utilizes streaming disk I/O.

22. The system as recited in claim 20, wherein the system further comprises:

a processor to execute computer instructions;

a file executable on the processor having a streaming flag associated therewith which, when set, indicates that the file utilizes streaming disk I/O; and wherein the means for distinguishing between streaming disk I/O and non-streaming disk I/O comprises a status monitor that checks whether the streaming flag associated with the file is set.

23. The system as recited in claim 20, wherein the system further comprises:

a processor configured to execute computer programs;

an application lookup table that contains names of computer programs that utilize streaming disk I/O; and wherein the means for distinguishing between streaming disk I/O and non-streaming disk I/O comprises a locator that searches the application lookup table for the name of the computer program executing on the processor and determines that the computer program uses streaming disk I/O if the name of the computer program is found in the application lookup table.

24. A system that processes streaming disk I/O and non-streaming disk I/O, the system comprising:

a disk that accepts and provides streaming disk I/O and non-streaming disk I/O;

a processor configured to execute streaming disk I/O and non-streaming disk I/O;

an I/O subsystem configured to queue streaming disk I/O ahead of non-streaming disk I/O so that the streaming disk I/O is executed by the processor before the non-streaming disk I/O is executed; and wherein the I/O subsystem distinguishes streaming disk I/O from non-streaming disk I/O by referring to an application lookup table that includes names of one or more applications that utilize streaming disk I/O and, if a name of an application that is the source of the disk I/O is included in the application lookup table, determining that the disk I/O is streaming disk I/O.

25. The system as recited in claim 24, wherein:

the I/O subsystem is further configured to add a name of an application to the application lookup table if the name of the application is not included in the application lookup table but is subsequently determined to utilize streaming I/O.

26. The system as recited in claim 24, wherein disk bandwidth is divided into discrete time quanta, each time quantum being a period of time in which a specified number of disk seek operations can be performed; and wherein the I/O subsystem is configured to process streaming disk I/O in a time quantum and, if any disk seek operations remain in the time quantum, to process non-streaming disk I/O in the remainder of the time quantum.

27. The system as recited in claim 24, wherein:

the processor is further configured to execute a computer program; and the I/O subsystem is further configured to distinguish between streaming disk I/O and non-streaming disk I/O by detecting a streaming flag that is associated with the computer program which is set when the program utilizes streaming disk I/O.

28. The system as recited in claim 24, wherein:

the system further comprises a plurality of files, at least one file having a streaming I/O flag associated therewith that is set if the file utilizes streaming I/O; and wherein the I/O subsystem is further configured to determine if the streaming I/O flag is set and, if so, determine that the disk I/O is streaming I/O.

29. One or more computer-readable media containing computer-executable instructions which, when executed on a computer, perform the following:

dividing disk bandwidth into discrete time quanta, each time quantum being defined as a particular number of disk seeks that can be performed in a specified period of time;

processing at least one disk seek of streaming disk I/O in a first time quantum;

processing at least one disk seek of non-streaming disk I/O in the first time quantum after processing the streaming disk I/O disk seeks; and deferring processing of any remaining non-streaming disk I/O disk seeks to a subsequent time quantum after the first time quantum has expired.

30. The one or more computer-readable media as recited in claim 29, further comprising determining whether the disk I/O is streaming disk I/O or non-streaming disk I/O.

31. The one or more computer-readable media as recited in claim 29, wherein the determining whether the disk I/O is streaming disk I/O or non-streaming disk I/O further comprises determining whether the disk I/O originated from a first disk sector that contains only streaming disk I/O or from a second disk sector that contains only non-streaming disk I/O.

32. One or more computer-readable media containing computer-executable instructions that, when executed on a computer, perform the following steps:

receiving disk I/O obtained from a disk;

determining if the disk I/O is streaming disk I/O by locating a name of an application in a streaming application lookup table that includes one or more names of applications that utilize streaming disk I/O;

if the disk I/O is streaming disk I/O, queuing the disk I/O to be processed at the beginning of a time quantum;

if the disk I/O is non-streaming disk I/O, queuing the disk I/O to be processed after queued streaming disk I/O in the time quantum if there is any unused time remaining in the time quantum; and if the name of the application is not included in the streaming application lookup table, determining if the disk I/O is streaming disk I/O or non-streaming disk I/O, and if the disk I/O is subsequently determined to be streaming disk I/O, adding the application name to the streaming disk I/O lookup table.

33. The one or more computer readable media as recited in claim 32, wherein the determining if the disk I/O is streaming disk I/O or non-streaming disk I/O further comprises determining whether the disk I/O originates with a streaming disk sector that includes streaming disk I/O or with a non-streaming disk sector that includes non-streaming disk I/O.

34. The one or more computer-readable media as recited in claim 32, wherein the determining if the disk I/O is streaming disk I/O or non-streaming disk I/O further comprises identifying a streaming I/O flag set in an application program interface that is set when the disk I/O is streaming disk I/O.

35. The one or more computer-readable media as recited in claim 32, wherein the determining if the disk I/O is streaming disk I/O or non-streaming disk I/O further comprises receiving information from the application that indicates that the application utilizes streaming disk I/O, and to queue disk I/O from the application as streaming disk I/O.

36. The one or more computer-readable media as recited in claim 32, the determining if the disk I/O is streaming disk I/O or non-streaming disk I/O further comprises identifying a file as utilizing streaming disk I/O by recognizing a streaming I/O flag associated with the file, and to queue disk I/O from that file as streaming I/O.

* * * * *